United States Patent [19]

Sherwood

[11] 4,355,379
[45] Oct. 19, 1982

[54] CONTINUOUS AUTOMATIC MIGRATION OF SEISMIC DATA WITH WAVEFORM PRESERVATION

[75] Inventor: John W. C. Sherwood, Whittier, Calif.

[73] Assignee: Chevron Research Company, San Francisco, Calif.

[21] Appl. No.: 567,458

[22] Filed: Apr. 14, 1975

Related U.S. Application Data

[63] Continuation of Ser. No. 410,058, Oct. 26, 1973, abandoned, Ser. No. 181,961, Sep. 29, 1971, abandoned, Ser. No. 28,197, Apr. 14, 1970, abandoned, and Ser. No. 768,149, Oct. 16, 1968, abandoned.

[51] Int. Cl.³ .......................... G01V 1/32; G01V 1/34
[52] U.S. Cl. ........................................ 367/68; 367/74; 346/33 C; 364/421
[58] Field of Search .............. 340/15.5 TD, 15.5 DP, 340/15.5 FC, 15.5 TC; 346/33 C; 367/68, 74; 364/421

[56] References Cited

U.S. PATENT DOCUMENTS 3,346,840 10/1967 Lara ............................ 340/15.5 R Primary Examiner—Nelson Moskowitz
Attorney, Agent, or Firm—Edward J. Keeling; H. D. Messner

[57] ABSTRACT

Amplitude-versus-time information of a seismic time section is automatically migrated so that events on the time section are displaced, both vertically and horizontally, into positions on a seismic depth section that correspond to actual spatial positions of seismic reflectors in the subsurface. The migration is continuous in the sense that it moves the entire waveforms, not merely previously picked events.

8 Claims, 8 Drawing Figures

REFLECTION SEGMENTS ($R_A$, $R_B$, $R_C$, $R_D$)
READ TO TIME SCALE IN SECONDS.
REFLECTOR SEGMENTS (A, B, C, D) READ
TO DEPTH SCALE IN THOUSANDS OF FEET.

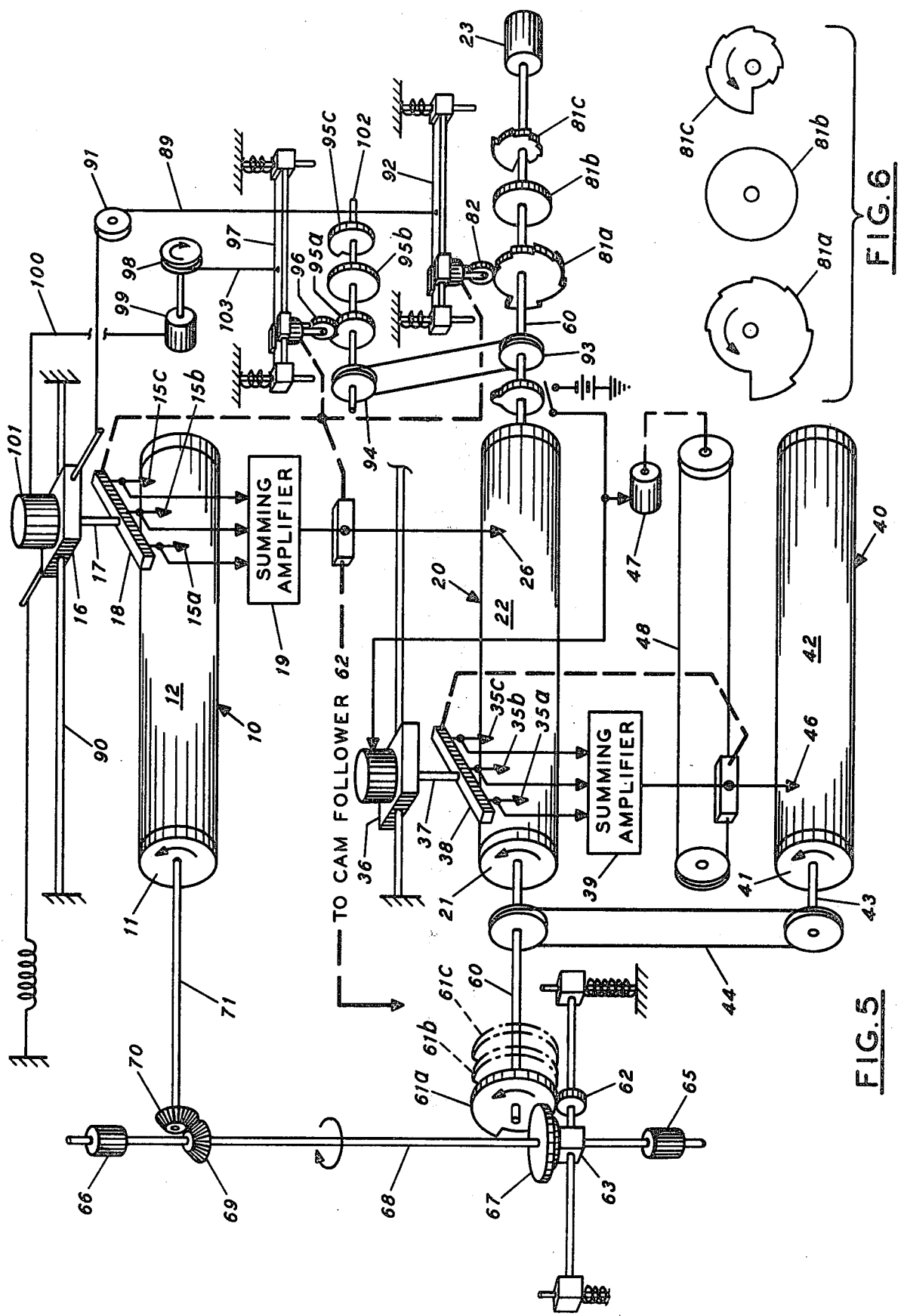

CONTINUOUS AUTOMATIC MIGRATION OF SEISMIC DATA WITH WAVEFORM PRESERVATION

This is a continuation of application Ser. Nos. 410,058; 181,961; 28,197; and 768,149 filed Oct. 26, 1973, Sept. 29, 1971; Apr. 14, 1970 and Oct. 16, 1968, respectively, and now abandoned.

This invention pertains to the art of geophysical prospecting and more particularly to the art of processing seismic data so that representations of significant events in those data may be displayed on a 2-dimensional surface, or in a 3-dimensional model, in locations corresponding to the actual spatial locations of the subsurface reflectors that produced those events.

It is well known in the art of seismic prospecting to display on a 2-dimensional surface the signals received by sets of geophones, the geophone positions being represented by points horizontally extended across the surface and the signals received from the geophones being represented by wiggly lines, (or variable density, or variable area lines) extending vertically from their respective geophone positions. The traces so represented are actually amplitude versus time traces. They do not directly represent subsurface reflectors but, because they are customarily displayed side by side, they do suggest by the apparent visual continuity of some of the recorded events from trace to trace, strata in the subsurface. It is customary to view events that are continuous from trace to trace as representations of the subsurface stratal reflectors, although skilled seismologists are at the same time aware that the reflectors so represented are not properly located spatially.

An array of traces like that described above, consisting of perhaps several hundred traces, is commonly referred to as a "time section" and the true object of the interpretation of the seismic data is to convert the time section into a "depth section" upon which events will actually represent reflectors in their proper spatial positions.

Referring to FIG. 1 which represents a conventional time section, one can note sets of reinforced wiggles from trace to trace under their respective geophones in which sets of wiggles the same event was evidently received sooner by the left-hand geophone than by the right-hand geophone of the set. It is, of course, known that in such a case the seismic wavelet represented by the event did not come from vertically below the respective geophones but must have come from some spatial location to the left of those geophones in the subsurface so that a spatially proper representation of that reflection should not be under the respective geophones.

It is even possible for events to appear on the time section in the wrong order with respect to depth. The time section can actually show a reflection from a shallower reflector at a later time than it shows a reflection from a deeper reflector, if the shallower reflector is highly dipping, and the deeper reflector is horizontal.

The most common manifestation of the deficiency of the time section is the one prominently exhibited in FIG. 1. If one were to think of the more or less horizontally connected events in FIG. 1 as representing subsurface strata, then, in the righthand lower part of the section, one would be confronted with the naturally impossible interleaving of two sets of strata. Sedimentary beds are, of course, not deposited in this way. The sets of apparently interleaving events are known to seismologists as "multiple time branches" and skilled seismologists know how, by hand calculations on selected events of the record, to "migrate" those selected events to spatially proper places on a depth section so that the phenomenon of multiple branches interleaving at an angle does not occur on the final depth section. But heretofore there has been no method to convert the entire ensemble of data on the time section into a spatially proper, corresponding ensemble of data on a depth section.

Another deficiency of the conventional time section, not as often apparent as the phenomenon of multiple time branches, is that the conventional time section by its very nature cannot show an abrupt horizontal discontinuity such as the abrupt ending of a stratum that has been cut off by a fault, or the abrupt beginning, at another higher, or lower, position, of the former continuation of that cut-off stratum. It can be shown theoretically that the conventional time section can show only an indefinite diffraction image of such an abrupt discontinuity. One of the outstanding advantages of the method to be described in the present invention is that it produces out of the indefinite diffraction representations of faults in conventional time sections, remarkably definite spatial representations of faulted ends of strata.

The general objectives of this invention are similar to those of D. W. Rockwell in U.S. Pat. No. 3,353,151, issued Nov. 14, 1967 for "Common Tangent Stacking Method and System for Locating Sonic Energy Velocity Discontinuities." However, Rockwell transformed his seismic data into "scaled wave-front patterns" and then combined those patterns to produce "reinforcement patterns" on his final plot. The superimposition of the various patterns upon each other required a final plotting medium upon which the response (e.g. the retained magnetization of a magnetic recording medium, or the optical density of a photographic recording medium) was proportional to the plotting intensity, over a large range of plotting intensities, and remained independent of the number of times the medium was resused (i.e. how many patterns were plotted on top of each other). It is difficult to get magnetic or photographic media that approach satisfaction of this ideal requirement. The method of the present invention uses a trace conversion scheme in which all intermediate traces, and all final traces, may be plotted in a parallel, side-by-side relationship, and no traces (or wave-front patterns) need to be plotted on top of each other.

Another prior patent pertinent to this invention is that of R. Lara, U.S. Pat. No. 3,346,840, issued Oct. 10, 1967 for "Double Sonogramming or Seismic Record Improvement", assigned to the assignee of the present invention. That patent teaches the use of the double sonogram, or inverse sonogram. Among seismologists, the sonogram itself is familiar as a set of parallel amplitude-versus-time traces, the individual traces representing individual directions into the earth, rather than individual geophones, or geophone groups, as do the traces of a conventional seismic record. Lara showed how the sonogram itself may be sonogrammed again (double sonogrammed, or inverse-sonogrammed) to produce a final set of parallel, amplitude-versus-time traces, the individual traces again representing individual locations rather than directions. In a preferred embodiment of the present invention, the principle of the double sonogramming operation is extended to the use of sonogram traces built up of segments from various parts of a seismic time section. Indeed, it is these sonogram trace segments that are literally migrated, rather than trace segments of the original record.

The preferred embodiment of the present invention comprises sonogramming conventional seismic traces from sets of geophones, or sets of geophone groups, to produce sonogram traces in which the amplitude-versus-time information is sorted so as to indicate the direction of arrival of its various components. Then, with the aid of a determined (or an assumed) seismic velocity function, segments of sonogram traces are migrated, both horizontally and vertically, into locations on an intermediate record, corresponding to the horizontal positions, and the depths, of reflectors that could have produced those segments. The information on the intermediate record, or intermediate sonogram section, is in the form of many small sonograms that are unlike prior art sonograms in the sense that their side-by-side traces did not come from side-by-side geophones, or geophone groups, but from possibly widely-spaced locations over the original seismic time section. Finally, the many small sonograms are sonogrammed again (double-sonogrammed, or inverse-sonogrammed) to produce new amplitude-versus-depth traces, among which successive vertical traces represent again successive horizontal subsurface positions, and events on those traces represent seismic reflectors in the subsurface in positions corresponding to their actual positions.

In a preferred form of the present invention, advance calculations are made with the aid of a determined (or assumed, or otherwise preselected) seismic velocity function to designate precisely which small portions of the original record are to be sonogrammed to produce the sonogram trace segments that will migrate to each small zone, or zonelet, of the intermediate sonogram section, and final seismic depth section.

Further aspects of the invention will become apparent from the following detailed description in conjunction with the accompanying drawings among which:

FIG. 5 is a representation of an electromechanical embodiment of the method of the present invention.

FIG. 6 is a set of elevational views of the cams of FIG. 5 that control horizontal migration.

In the first part of the following teachings, it will be assumed, for didactic purposes, only, that the seismic velocity, v, of the propagation of seismic waves through the earth, is a constant. Actually, in most cases of practical significance, the seismic velocity tends to increase with depth. (The product of the seismic velocity and the formation density changes rather abruptly at certain subsurface interfaces and this is the very cause of the usable seismic reflections that are manifested as events in the individual traces of the seismic record.) The initial explanation here will be helpfully shortened and simplified by the constant velocity assumption. The complication of varying the velocity as a function of the vertical spatial coordinate will be taken up later in the specification. A further possible complication, velocity variation with the horizontal coordinate, will not be taken up explicitly. It will be apparent to skilled seismologists how this complication should be added to the steps to be described. In the first part of the discussion, wave paths will be shown as straight lines. It is well known that vertical velocity variations causes such paths to become curves whose departure from verticality increases with depth. The dip angles of the reflectors shown in the first figures as equal to the moveout angles with which seismic waves are received at the surface, will in the more realistic case, become unequal and greater. In the general case, wave paths are not describable by simple mathematical expressions. However, skilled seismologists will recognize that the essential elements of the present invention will be unchanged by the elaborations obviously necessary to handle the most general type of velocity variation.

Figure 1:
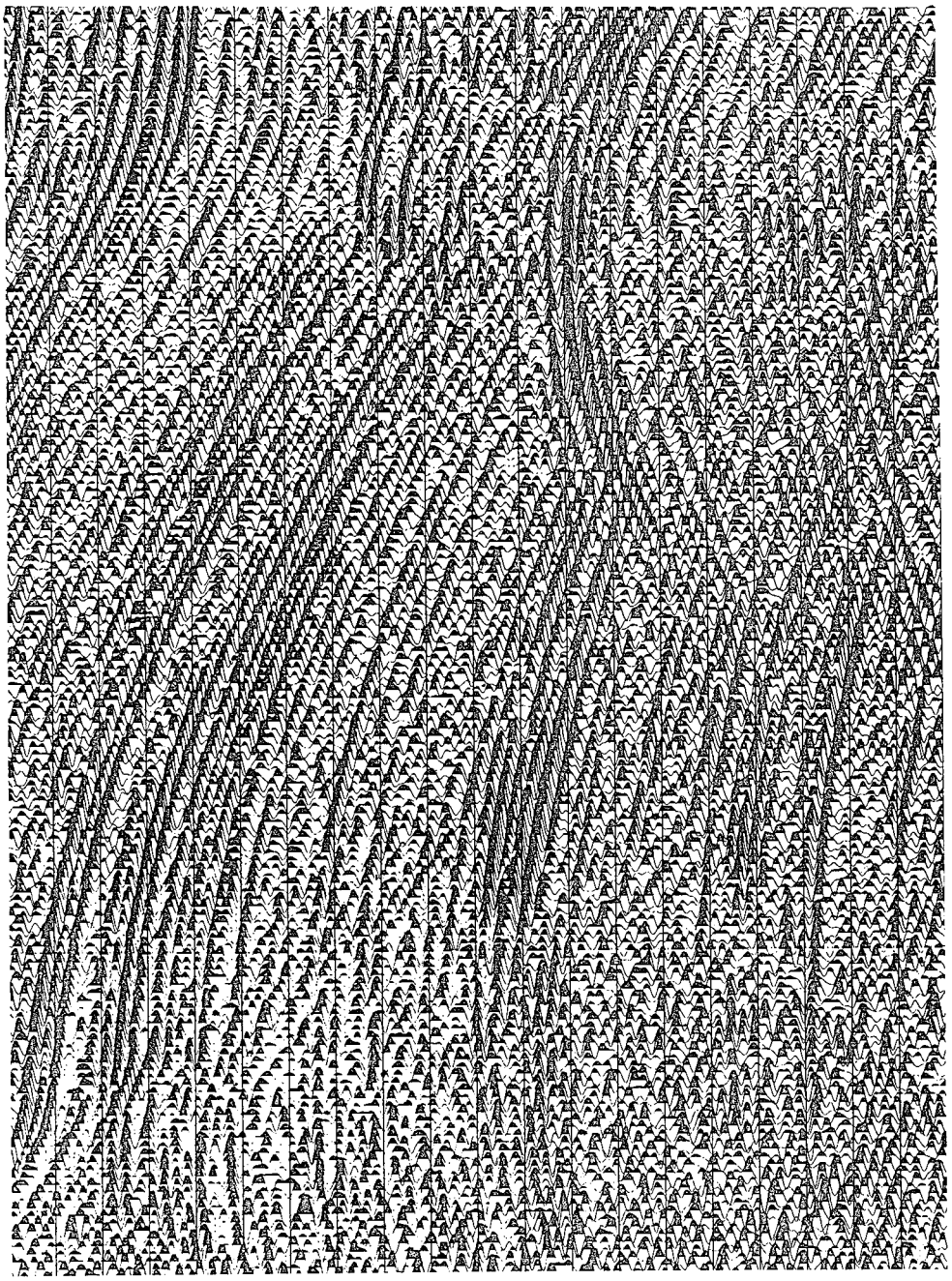
FIG. 1 is an actual example of a conventional seismic time section.
Figure 2:
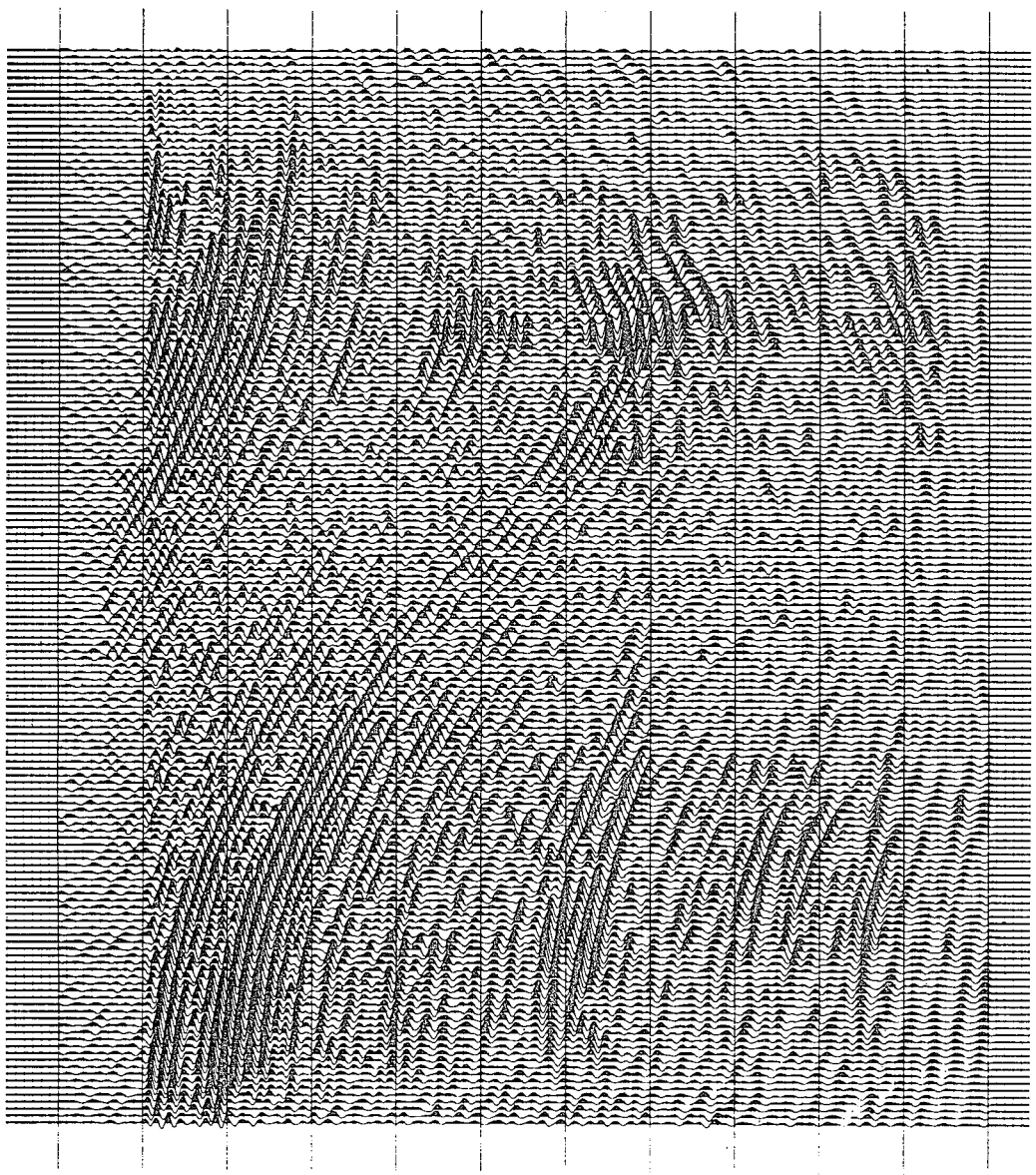
FIG. 2 is a seismic depth section produced by the method of the present invention from the data represented in FIG. 1.
Figure 3:
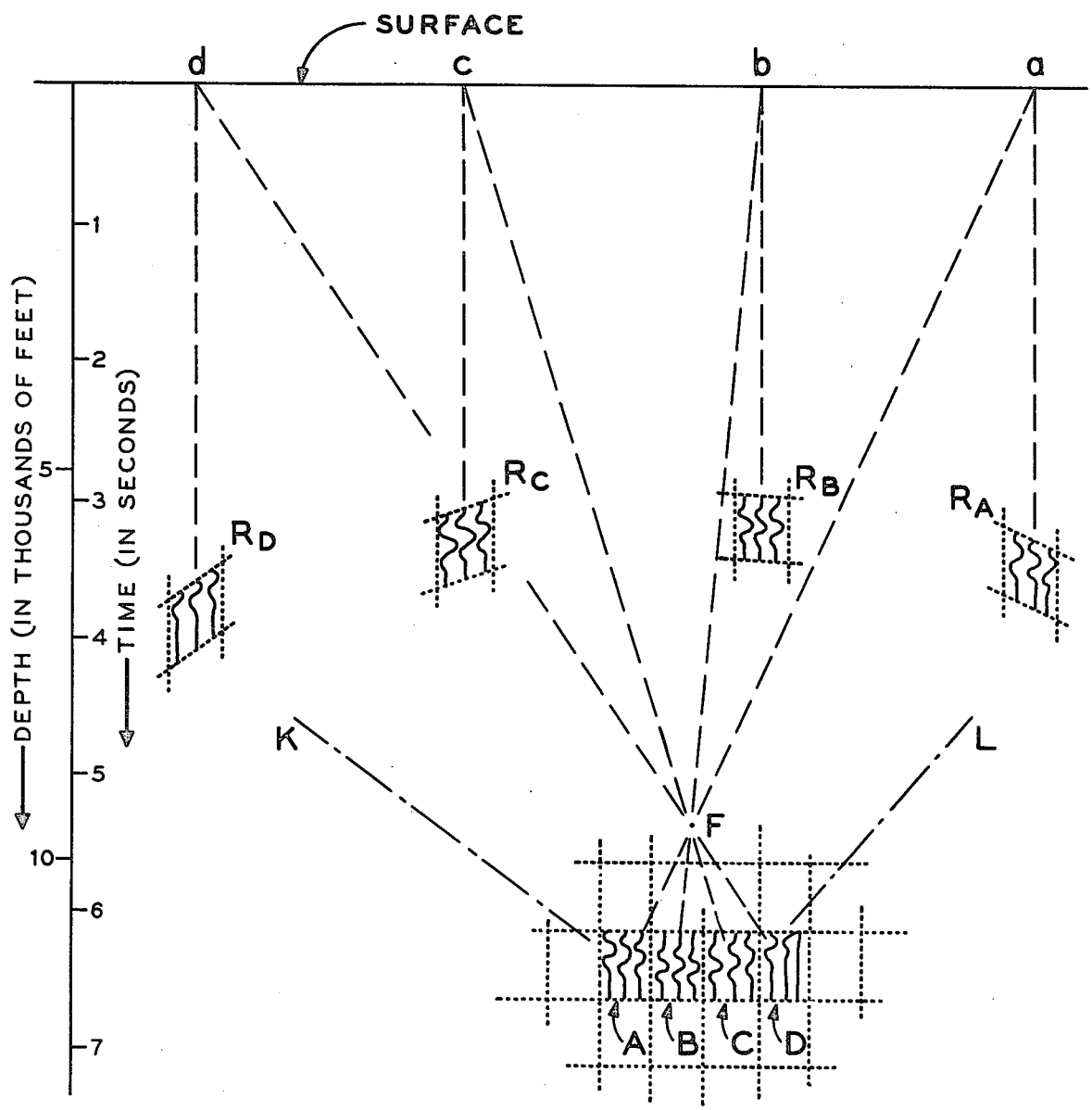
FIG. 3 is a schematic representation of an upwardly concave subsurface reflector, and some reflection segments produced by that reflector on the seismic time section.

Reference is now made to FIG. 3, in which is represented a single subsurface seismic reflecting formation, K to L, that is concave upward in the zonelets, A, B, C and D. As a matter of interest, the single reflecting formation of FIG. 3 is an idealized representation of one of the actual reflecting strata represented in FIG. 2 (slightly below center and near the right side). The idealization is carried to the extent of giving the highly curved part of the reflectors in zonelets A, B, C and D a center of curvature, or focus, F. Four reflections are schematized in FIG. 3. The reflected wave from zonelet A, for instance, travels through the focus F toward geophones in the neighborhood of point a, and it will appear at $R_A$ on a time section under point a at a downward distance proportional to the path length from the reflector to point a. Note that in FIG. 3 the depth section shows the reflector at its actual depth while the time section shows the reflection at a position determined by the velocity function assumed for the formation. The most remarkable feature of the set of reflections $R_A$, $R_B$, $R_C$ and $R_D$ is that on a time section they form a group that is concave downward instead of concave upward as is the reflector of their origin. It is also noteworthy that the part of the reflector in zonelets A, B, C and D is manifested in seismic signals that are spread over a much larger horizontal distance than is that part of the reflector itself.

Now, the fundamental problem solved by the present invention is to gather data from everywhere on the time section and relate them back to the subsurface locations of their origin. If time sections contained only a few simple data as shown in FIG. 3 the solution would be easy and obvious. The reflection $R_A$ shows a definite "moveout", i.e., among the geophones in the neighborhood of point a, the left-hand geophone received the signal before the right-hand geophones. Obviously then, the reflection came from below and to the left at an angle indicated by the moveout angle and at a distance equal to half the time of receipt on the time section multiplied by the seismic velocity. Similar reasoning would apply to reflections $R_B$, $R_C$ and $R_D$.

As simple as is the FIG. 3 example, it indicates the fundamental mathematical difficulty of the migration of seismic records. The migration process is not just a "mapping" process in which each point on the time section corresponds to a point on the depth section, so that a wiggle appearing at a time section point just needs to be transferred to its corresponding depth section point. In the migration process, a wiggle appearing at a point on the time section may need to be transferred leftward or rightward depending on what direction is indicated by the kind of reinforcement which that wiggle receives from wiggles on neighboring traces. More precisely, each wiggle must be separated into a number of components, according to the various reinforcements it receives from its neighbors, and these components must be transferred to various, perhaps widely spaced, locations.

The migration process of the present invention may be carried out, using presently available apparatus of reasonable complexity, and using presently available recording materials, (either magnetic tapes or photographic films), if the migration is performed in two overall steps as follows: The original data are scanned at various preselected moveouts, and the results of the scannings are stored on an intermediate sonogram section that is divided into zonelets, each zonelet as a whole having a horizontal coordinate and a vertical coordinate referring to its center point. Within each zonelet of the intermediate sonogram section the amplitude information is in the form of vertical traces representing amplitude versus depth; but there the similarity to conventional seismic records stops. Within each individual zonelet the neighboring traces from left to right do not represent different horizontal positions; they are all associated with the same horizontal position, the position of the center of the zonelet. The different traces from left to right within an individual zonelet represent different stratal dip angles on both the intermediate sonogram section and the final seismic depth section.

The collection of traces, from left to right within an individual zonelet, constitutes a small sonogram, but as mentioned hereinbefore, it is a sonogram unlike prior art sonograms in the sense that its side-by-side traces did not come from side-by-side geophones, or geophone groups, but from possibly widely spaced locations over the original seismic time section.

In the second overall step, the individual zonelets are themselves sonogrammed, and for each individual zonelet a final set of traces is produced, which now do represent successive horizontal positions by their successive horizontal order.

In the finally produced seismic depth section all vertical traces represent amplitude-versus-depth information, and the horizontal distances between traces represent actual horizontal distances, so that all amplitudes may now be properly said to be functions of just two coordinates, the horizontal displacement and the depth.

In the process as described so far the sonogram has been mentioned several times, and reference has been made to the Lara patent, U.S. Pat. No. 3,346,840, which discloses and explains double sonogramming or inverse sonogramming. Whereas the Lara patent should serve as a basic reference for the understanding of the present invention, the steps of double sonogramming, or inverse sonogramming, as explained in that patent, are disclosed as being performed on a sonogram consisting of traces all of which came from a set of neighboring traces. The final result of the Lara double sonogramming is a set of traces containing the same basic information as that original set of neighboring traces, but in the processed traces the meaningful information has been emphasized and the meaningless information (the noise) has been deemphasized. In the present invention, the sonogram is used in a different, and more advanced way. The sonogram traces from an original set of neighboring traces are not kept together. Instead, the traces indicating receipt of seismic waves from, say, a leftward direction are moved to leftward locations, and the traces indicating receipt of seismic waves from a rightward direction are moved to rightward locations. The traces that become neighboring traces on the intermediate sonogram section have not necessarily been derived from neighboring original semismic traces.

Sonogramming is here used for separating information according to its arrival directions, and then transferring the separate parts to sometimes widely separated parts of an intermediate sonogram section. The transferred sonogram trace segments act as compact information storage devices. Information gathered from several (or many) traces is stored in one trace segment which is transferred to a new location, and in that location the transferred segment stores information that the second sonogramming operation will spread out over several (or many) neighboring traces.

Figure 4:
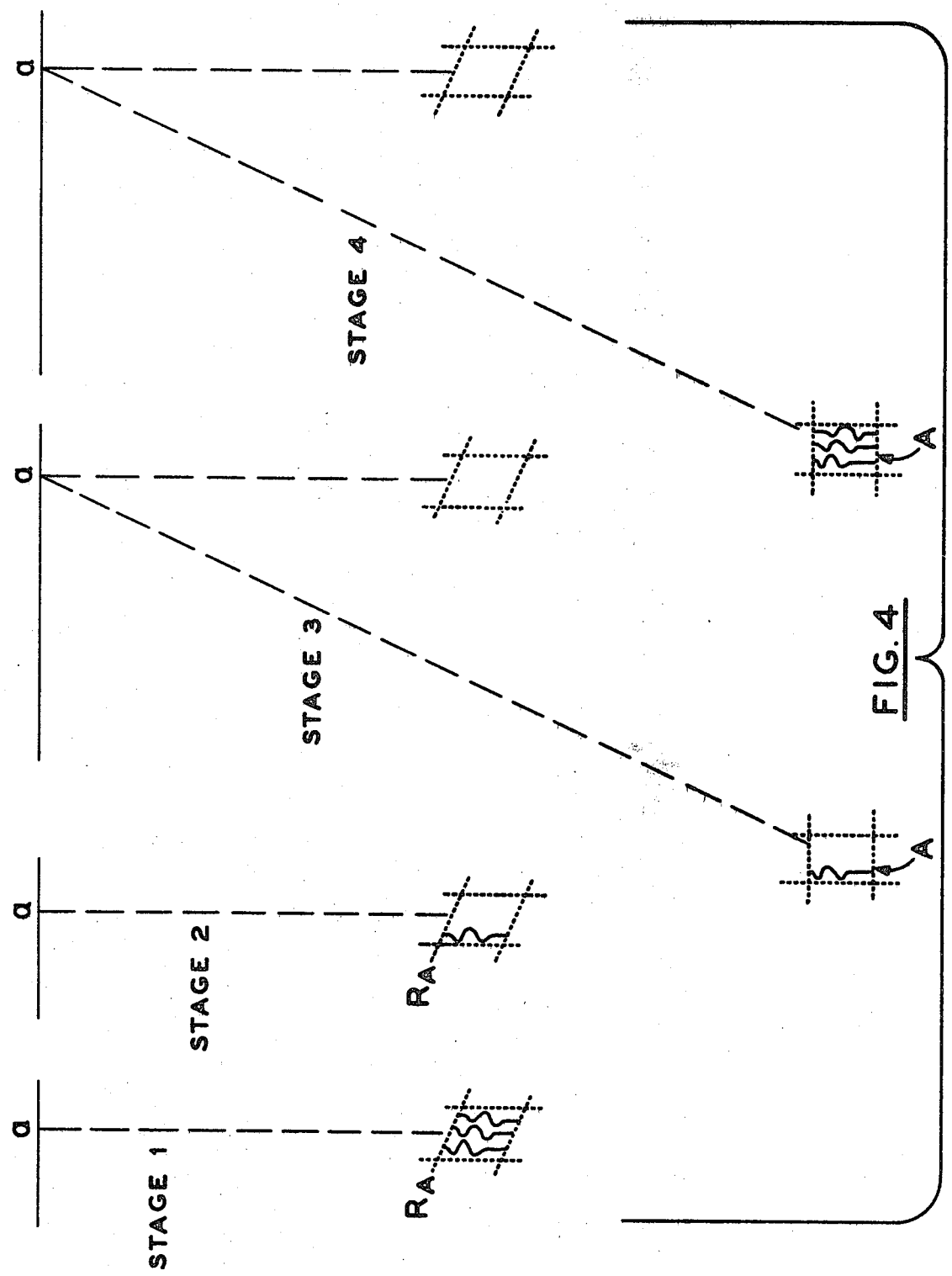
FIG. 4 is a schematic representation of four stages in the treatment of a reflection segment.

The basis idea of compact storage before migration, and expansion after migration, is schematized in FIG. 4, which is intended to represent four stages in the treatment of the single reflection segment $R_A$ of FIG. 3. The original reflection segment is shown in Stage I, manifested on several traces (shown here as only three traces, for simplicity). The sonogramming operation puts the information of reflection segment $R_A$ into a single trace segment, shown in Stage 2, whose leftward position in its sonogram space shows the moveout of the original segment, and takes part in indicating to what zonelet on the intermediate sonogram section the trace segment should be migrated. Stage 3 represents the single trace segment, after migration, in a zonelet on the intermediate sonogram section. (The straight dotted line indicating the direction and extent of migration are, of course, understood to represent the simplified case of constant seismic velocity).

Stage 4 shows the result of the seocnd sonogramming operation that spreads the information stored on the left-hand trace of the sonogram section zonelet into a seismic wavelet manifested on all traces of the final depth section zonelet.

At this point it may be appreciated that the compaction associated with sonogramming makes possible the solution of the information storage problem mentioned in an early part of this specification. It becomes unnecessary to plot traces on top of each other as in the prior art, and it theefore becomes unnecessary to find magnetic or photographic information storge media which have responses that remain linear, independently of the number of times those media are reused.

In the example schematized in FIG. 4, a complete set of traces could have been shown in the intermediate sonogram section zonelet, but in the simplified case intended to be represented here, the other traces would be "blank"—that is, they would show no wavelets that would indicate other semisic reflectors crossing the reflector there represented. In actual practice all traces of all zonelets may be recorded, and each of them may contain at least some "noise" which manifests itself as false reflector segments superimposed on whatever true reflector segment is properly indicated. The practical usefulness of the process, of course, depends on the existence of a high enough signal-to-noise ratio to make the true reflector segment dominate the display. In any case, it will be appreciated that the migration process, tending as it does to separate superimposed information from various directions, must, in all but the most exceptional circumstances, greatly increase the effective apparent signal-to-noise ratio of the seismic record section. This is well indicated in the actual case examples shown here as FIGS. 1, 2, 7 and 8.

There are other known ways to increase the effective apparent signal-to-noise ratio of a seismic record section. Various kinds of nonlinear amplification, and "picking", or both may be applied to seismic data, and these may be applied during one or more of the stages of the method of the present invention to enhance the final record. Example methods of enhancement are mentioned in the previously cited Lara patent, U.S. Pat. No. 3,346,840, and more extensive descriptions are found in two other patents, U.S. Pat. No. 3,149,302, Klein et al, "Information Selection Programmer Employing Relative Amplitude, Absolute Amplitude and Time Coherence," and U.S. Pat. No. 3,273,114, Stephenson et al, "Ergodic Signal Picking", all assigned to the assignee of the present invention.

FIG. 5 illustrates an analog form of apparatus for carrying out the method of the present invention. The analog form has here been shown because it is more readily comprehendable in terms of its ability to perform the steps of the method of this invention. However, it will become evident that the method can also be, and in most cases will be, performed employing a large storage capacity, high speed computer between the field tapes and the final seismic section.

In FIG. 5 a seismic time section playback system 10 includes a rotatable drum 11 on which can be mounted a typical recorded magnetic tape 12 storing a seismic time section consisting of a plurality of amplitude-versus-time seismic traces. A plurality of magnetic pickup heads 15a, 15b and 15c is carried on a pivotally mounted head moving bar 18 with its pivot axis 17 at its center. The individual pickup heads reproduce the traces of the seismic time section in the form of electrical signals and these signals are transmitted through conductors to a summing amplifier 19. The signal produced by the summing amplifier 19 is an amplitude-versus-time seismic trace known as the sonogram trace for the moveout represented by the pivot angle of the pivotally mounted head moving bar 18 (see U.S. Pat. No. 3,346,840) at the horizontal (axial) coordinate of the pivot axis 17 (sonogram pivot point).

The procedure of sonogramming is well known in the seismic art; it constitutes the production of a plurality of amplitude-versus-time traces of the sum of the instantaneous signal amplitudes of adjacent traces of a profile of a seismic time section, each trace being a summation with differential time shifts between the traces of the profile section. The summation traces are recorded as representing the directional plane wave components in the profile of the seismic time section at the moveout corresponding to the pivot angle of the pivotally mounted head moving bar 18. The sonogramming procedure transforms the profile of the seismic time section from a plurality of amplitude-versus-time traces having different horizontal coordinates into a plurality of amplitude-versus-time traces having different moveouts.

A second recording and playback system 20 is electrically and mechanically associated with the first playback system 10. This system 20 includes a rotatable drum 21 adapted to support a suitable recording medium 22 such as a pre-erased magnetizable tape. The drum 21 is rotatable on its shaft driven by a motor 23. The surface of the recording medium 22 is considered to be divided into circumferential strips of about the same width as that of the profiles on the record 12 of the seismic time section. The circumferential strips are further considered to be divided into zonelets of small circumferential increment, all of the same size. The circumferential dimension of the recording medium 22 represents depth below a datum level in the earth corresponding to a zero value for the time on the seismic time section of system 10.

The zonelets themselves on recording medium 22 are located by a horizontal coordinate (parallel to the axis of the drum 21) and a vertical coordinate (circumferential on the drum 21). The horizontal coordinate of the center of a zonelet corresponds to horizontal distance along or within the earth, and the vertical coordinate corresponds to depth within the earth. However, within the individual zonelets, although the vertical coordinate retains the correspondence to depth, the horizontal coordinate of an individual trace corresponds to formation dip angle.

An intermediate sonogram section is recorded on the recording medium 22 and each zonelet of the intermediate sonogram section will contain the sonogram transform of the reflector surface for the corresponding rectangular region of the earth that is centered on the horizontal and vertical coordinates of the center of the zonelet.

Segments of the individual sonogram traces, as produced from the seismic time section playback system 10 at summing amplifier 19, are recorded by recording head 26 on recording medium 22. The assembly of segments of traces forms the intermediate sonogram section.

As the entire seismic time section, made up of a plurality of profiles, on record 12 on system 10, is fully sonogrammed, individual sonogram segments in the zonelets of the intermediate sonogram section on recording medium 22 are generated, and the recording medium 22 will finally contain an intermediate sonogram section. This intermediate sonogram section will be made of segments divided from the individual sonogram traces, generated by system 10, migrated, in accordance with a preselected seismic velocity function, to the zonelets of the intermediate sonogram section identified by their depths and horizontal coordinates. The segments of the individual sonogram traces will be ordered within the zonelets according to the dip angles of their represented moveouts.

The second recording and playback system 20 is further provided with a plurality of magnetic pickup heads for converting the intermediate sonogram section into the desired and result, the seismic depth section. A plurality of magnetic pickup heads 35a, 35b and 35c is carried on a pivotally mounted head moving bar 38 with its pivot axis 37 at its center. The individual pickup heads reproduce the traces of the intermediate sonogram section in the form of electrical signals and these signals are transmitted through suitable conductors to a summing amplifier 39. These pickup heads sonogram the intermediate sonogram section one circumferential strip at a time. There must be one magnetic pickup head for each trace (that is, each represented dip angle) on the intermediate sonogram section (although only three heads are shown in the figure for simplicity).

The effect of sonogramming a sonogram record has previously been described in U.S. Pat. No. 3,346,840.

When the intermediate sonogram section, produced from dividing sonogram traces into segments, migrating and placing these sonogram trace segments into their proper spatial positions is further sonogrammed, final amplitude-versus-depth trace segments are produced, representing reflectors in the zonelets of the seismic depth section. These amplitude-versus-depth trace segments are generated in the summing amplifier 39 and supplied to a third recording system 40.

The third recording system 40 is electrically and mechanically associated with playback system 20. This system 40 includes a rotatable drum 41 adapted to support a suitable recording medium 42 such as a pre-erased magnetic tape. The recording drum 41 is supported on a shaft 43 and driven in synchronism with the shaft of playback system 20 from motor 23 through belt drive mechanism 44. The dimension parallel to the axis of drum 41 on recording medium 42 is the horizontal coordinate, and the circumferential dimension on recording medium 42 represents depth. Recording medium 42 is considered to be divided into final zonelets having boundaries corresponding to those of the respective zonelets of the intermediate sonogram section. The sonogram of the sonograms in the zonelets of the intermediate storage medium are placed in the corresponding final zonelets of recording medium 42 to construct the final seismic depth section.

As the intermediate sonogram section on drum 21 is sonogrammed, one circumferential strip at a time, the recording head 46 is moved, by means not shown, one trace position to the right for each revolution of drum 41, to cover a strip on drum 41 corresponding to the strip being sonogrammed on drum 21.

Up to this point, the description of the operation of the apparatus in FIG. 5 has proceeded in a type of chronological order, beginning with the original data on drum 11 and ending with the final data on drum 41. However, up to this point, the description has not dealt with the interdependence of the rotational motions of drums 11 and 21, and with the interdependence of the axial motions of the head positioner 16 and head 26. These interdependences are in turn dependent on the way in which the seismic velocity varies with depth, and from this point in this specification, the simplification of constant seismic velocity must be laid aside, so that some of the necessary complications can be described. Because the seismic velocity is a function of the depth z, represented by the angular coordinate of rotation of the drum 21, rather than a function of the time t, represented by the angular coordinate of rotation of drum 11, it now turns out that the interconnection of drums 11 and 21 must be arranged so that the second drum, 21, controls the first drum, 11, rather than vice-versa.

Consider now a sonogram trace being plotted on drum 21. The trace will begin at (or approximately at) zero depth and proceed toward the total depth, corresponding to the major part of a revolution of drum 21. The entire single sonogram trace will represent data for a fixed dip angle $\theta$ in the x-z plane, and the entire single trace will be at a constant horizontal coordinate, x, (a constant axial coordinate) on the drum 21. However, for the data to represent a constant dip angle, and to be plotted at a constant horizontal coordinate in the intermediate sonogram section, with only the depth z varying, they cannot come from locations in the time section all having the same horizontal coordinate, or even having the same moveout angle. Qualitatively, it is obvious that if the sonogram trace being plotted represents reflectors dipping to the left, then as the depth z increases, the horizontal coordinate at which corresponding signals werereceived on the time section must move leftward. It is also evident that with velocity variation of the usual sort, increasing monotonically with depth, the moveout angle at which corresponding signals were received on the time section must decrease as the depth z increases, when the reflector dip angle is held constant. Even the simplest relationship, the one between the time t and the depth z, which quantities are represented by the rotational angles of drums 11 and 21 respectively, is not a simple proportionality in the variable velocity case. It is this relationship which will here be dealt with first.

From familiar fundamental equations of geophysics, it is not difficult to show that, if the seismic velocity variation with depth is represented by a function of depth, v(z), then the two-way travel time $t(z_i)$ for a reflector at depth $z_i$, having a dip angle, $\theta(z_i)$, is:

$$t(z_i) = \int_0^{z_i} \frac{2dz}{v(z)\sqrt{1 - [v(z)/v(z_i)]^2 \sin^2\theta(z_i)}}$$

Inspection of the above equation shows that instead of $t(z_i)$ being directly proportional to $z_i$ it is less than proportional, or the coefficient of proportionality decreases with increasing $z_i$ no matter what the dip angle may be (although the greater the dip angle, the less the coefficient decreases). Apparatus to take into account this relationship is incorporated into the apparatus of FIG. 5 as follows:

As the drum 21 is turned by motor 23, shaft 60 turns the cam 61a whose varying radius is sensed by follower 62, which through bushing 63 raises and lowers the integrating wheel 67. Integrating wheel 67 is rotated by cam 61a through frictional contact, but the radius at which it contacts the side of cam 61a varies as the outer radius of cam 61a varies. It will be evident that the outer radius of cam 61a can be cut so that the radius at which integrating wheel 67 contacts the side of cam 61a varies as the total derivative with respect to the upper limit, $z_i$, of the above equation. Integrating wheel 67 slides axially on shaft 68, which is held in bearings 65 and 66, but integrating wheel 67 is keyed to shaft 68 so that the rotational motion of integrating wheel 67 is transferred to shaft 68, then through gears 69 and 70 and shaft 71, to drum 11. The cumulative rotation of drum 11 must be proportional to the integral of the differential rotations of integrating wheel 67. Therefore, the two-way travel time, represented by the cumulative angular rotation of drum 11, must be related to the depth $z_i$, represented by the cumulative angular rotation of drum 21, as prescribed by the above equation.

It is evident from inspection of the equation for two-way travel time in conjunction with the above description that a different cam will be required for each different dip angle (different in absolute value; no difference is required for a change of sign only). In FIG. 5 two more cams, 61b and 61c, are shown in phantom, although in actual practice many cams will be needed for many dip angles. Just as recording head 26 of record playback system 20 and head 46 of record playback system 40 are to be moved one step at a time, the cam follower 62 is moved one cam at a time along its shaft after each revolution of drum 21 to engage a different cam for each different dip angle. The step mover for cam 62 is not herein shown but could take the form of conventional available stepping operators actuated by horizontal movement of recording head 26.

The set of cams shown in FIG. 5 are exemplary of a particular preselected velocity function. It should be apparent that separate sets of cams will be required for different assumed or determined variations of seismic velocity with variations of depth below the earth's surface.

Now, the relation between the rotational motion of drum 21 and the axial motion of head positioner 16 will be described. The controlling mathematical expression is somewhat similar to the previous one for two-way-travel-time versus depth. The horizontal migration distance, which is the difference, $\Delta x$, between the x-coordinate of the geophones receiving a reflection, and the x-coordinate of the corresponding reflector at depth $z_i$ and dip angle $\theta$ is:

$$\Delta x = \sin \theta \int_0^{z_i} \frac{v(z)dz}{v(z_i)\sqrt{1 - [v(z)/v(z_i)]^2 \sin^2 \theta}}$$

The sin $\theta$ quantity in front of this expression of course causes the horizontal migration to be plus or minus, rightward or leftward, in accordance with the sign of the dip. Apparatus to take into account the above relationship is incorporated into the apparatus of FIG. 5 as follows:

At the beginning of a rotation of drum 21, head positioner 16, which is slidable or fixable on shaft 90 is moved by means, not shown, into an x-position so that its axis which corresponds to the sonogram pivot point is in a position corresponding to the x-position of the center of a zonelet on drum 21 of the intermediate record and the head moving bar 18 is rotated on shaft 17 according to the position of head 26 within the zonelet. Then the head positioner is fixed to shaft 90. Connected to the head positioner is a cable 89 that leads over pulley 91 to bar 92 which is constrained to move vertically only, in response to cam follower 82 which, in the figure, rests on cam 81a. As drum 21 rotates, cam 81a rotates on its common shaft 60. Cam 81a is cut according to the above equation relating horizontal migration distance to the x-position. Cam 81a represents a negative (or leftward dipping) dip angle, so that as it rotates, it causes the described mechanism to step head positioner 16 leftward. Cam 81b represents zero dip angle, the case in which no horizontal migration is necessary. Cam 81c represents a positive (or rightward dipping) dip angle, and it produces rightward motion of head positioner 16 during rotation of drum 21. It will be appreciated that whereas only three cams are shown in the figure, many cams are needed in carrying out the method. A set of cams, one for each dip angle $\theta$, is needed for each velocity funtion v(z). Likewise, a suitable step motion device will be needed to move cam follower 82 after each rotation of drum 21. The step motion device may also be actuated by horizontal movement of recording head 26.

The steps on cams 81a and 81c, more clearly shown in FIG. 6, are necessary because head motions on drum 11 are desirable, and permissible, only when head 26 is on a horizontal boundary between two of the zonelets into which the intermediate sonogram section is considered to be divided. So the changes of radius of the cams occur only at shaft angles corresponding to those boundaries. Furthermore, there is an evident restriction on the changes of radius; they must be quantized so that the reading heads attached to bar 18 always move an integral number of trace separation distances. So it will be appreciated that the cams are cut according to average values of the $\Delta x$ as a function of z equation, stepped and quantized in accordance with these constraints.

The last functional relationship that needs description here is the one controlling the moveout angle, the rotational angle of the head moving bar 18 about the axis of shaft 17. (That axis corresponds to the sonogram pivot point during the sonogramming of record 12.)

It is not difficult to show that, if the seismic velocity variation with depth is represented by a function of depth, v(z), then the moveout m of the emergent reflection from a reflector at depth z, having a dip angle $\theta(z)$ is:

$$m(z) = \frac{dt}{dx} = \frac{2 \sin \theta(z)}{v(z)}$$

If the rotational angle of pivot axis 17 is denoted by $\alpha(z)$, then it follows, from simple geometry, that the moveout sonogrammed by heads 15a, 15b and 15c is given by:

$$m(z) = \frac{dt}{dx} = k_{12} \tan \alpha(z)$$

where $k_{12}$=a constant of proportionality between t and x on recording medium 12.

Then:

$$\alpha(z) = \arctan \left| \frac{m(z)}{k_{12}} \right|$$

$$= \arctan \frac{2 \sin \theta(z)}{k_{12} v(z)}.$$

This relationship is incorporated into the apparatus of FIG. 5 as follows:

Cams 95a, 95b, and 95c, mounted on shaft 102, are out so that their radii, $r_m(z)$, are given by:

$$r_m(z) = 1 - k_m \alpha(z)$$

where $k_m$=constant of proportionality between cam radius and pivot axis 17 rotational angle.

Cam 95a is for a negative $\theta$, cam 95b is for $\theta = 0$ and cam 95c for a positive $\theta$. Consider the case of sonogramming to find reflectors of a negative dip angle $\theta$. As drum 21 is turned by motor 23, shaft 60 turns pulley 93, which turns pulley 94, and in turn cam 95a, whose varying radius is sensed by follower 96, which through bar 97 and cable 103 and real 98 transmits a rotation to position repeating motor 99. Motor 99 is connected through leads 100 to its mate 101, which rotates shaft 17 at head position 16. Thereby, the moveout at which record 12 is being sonogrammed changes in accordance with the cam contour that was produced in accordance with the above given equation.

It is evident from inspection of the equation for moveout in conjunction with the above description that a set of cams, one for each dip angle $\theta$, is needed for each velocity function v(z); in FIG. 5 only two more cams, 95b and 95c, are shown. Step motor drives, not herein shown, will be necessary to move cam follower 96 to alignment with the appropriate cam. Such a drive is illustrated by dotted line following the movement of recording head 26. Similar mechanism may also cause step movement of cam follower 62 with respect to the cams 61a, 61b and 61c and cam follower 82 with respect to cams 81a, 81b and 81c.

The foregoing paragraphs complete the description of the present method as carried out on a particular three-drum analog apparatus. It will be appreciated, however, that the apparatus illustrated has been selected as one form of apparatus that can perform the method and that both minor and major modifications could be made to the described apparatus without changing the method itself. Minor modifications would be, for example, substitutions of electronic function generators and servo systems for the described cams and mechanical linkages. In another version of the apparatus, various velocity functions would be fed into the system from punched cards. Major modifications would be substitutions of narrower, computer-type magnetic tapes for the broad, drum-wound, magnetic tapes pictured in the attached figures. Such modifications would require serial arrangement of data here assumed to be in parallel arrangement. Nevertheless, such modifications would be within the present skill of the seismic art. Indeed, after the method has been described, it is within the present skill of the art to carry out the entire method on a large scale digital computer such as the IBM 360/50.

Figure 7:
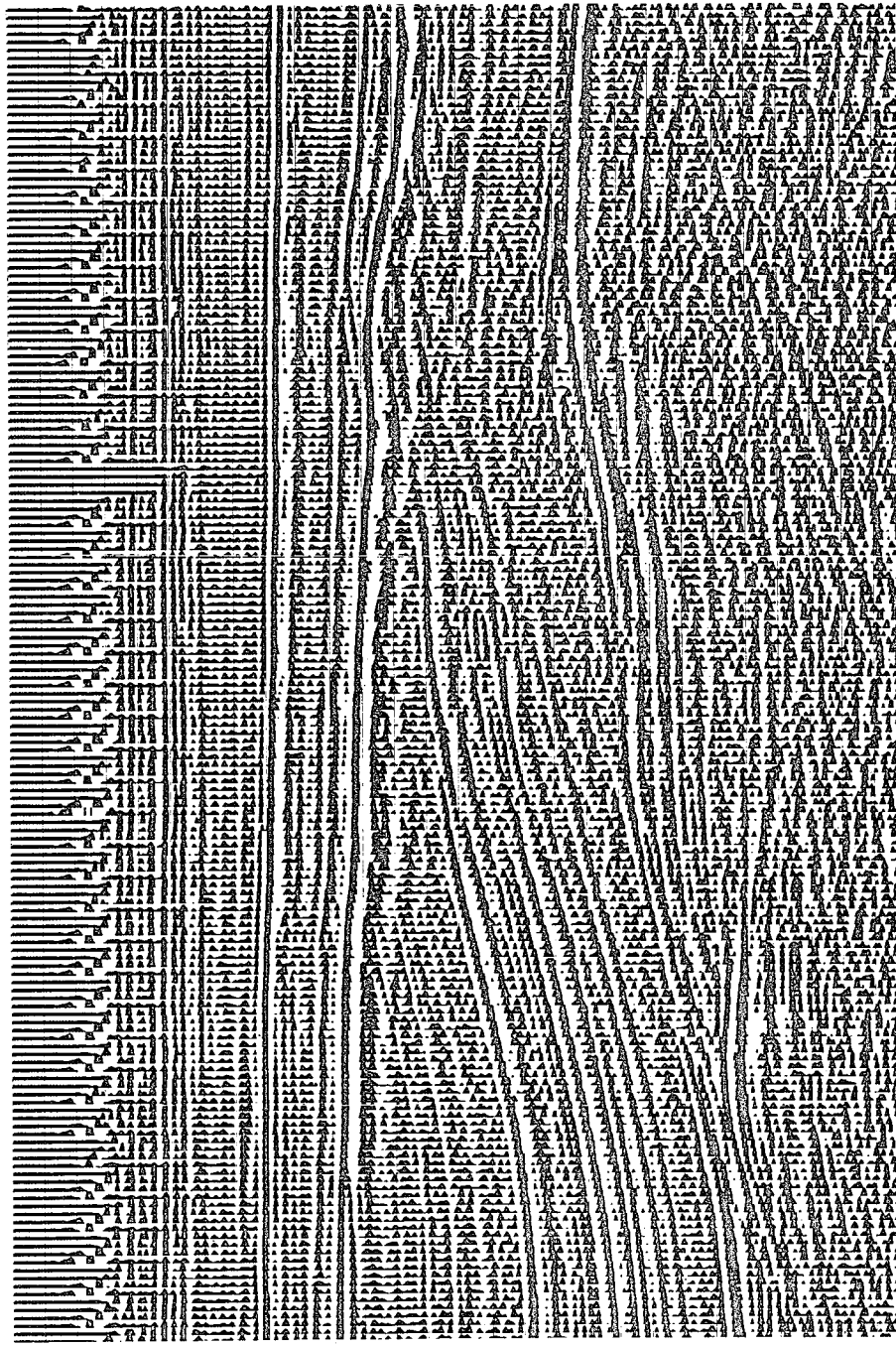
FIG. 7 is an actual example of another conventional seismic time section.
Figure 8:
FIG. 8 is a seismic depth section produced by the method of the present invention from the data represented in FIG. 7.

The visible results of the described method constitute more than an incremental improvement over results of the prior art. The difference is sometimes so great that meaningful comparisons are impossible. FIGS. 7 and 8 are intended to illustrate this point. In FIG. 8, which is reproduced from an actual final seismic depth section prepared by this method, a fault is clearly visible above and to the left of the center of the section. One pair of strata shows a clear termination, a vertical shift, then a resumption. It would have been impossible to produce this fault image by the methods of the prior art that involved migration of small "picked" portions of the time section. This is because the diffraction image of the fault, in the time section, FIG. 7, is too indefinite to be pickable by state-of-the-art methods. FIGS. 7 and 8 are therefore believed to provide both a clear indication of the novelty and a clear illustration of the power of the above-described invention.

The final seismic depth section reproduced in FIG. 8 was actually prepared by performing the method of the present invention on a large scale digital computer. It should be understood that the analog apparatus here shown as mechanical devices electrically interconnected are intended to assist in the understanding of the invention. The best mode contemplated by the inventor of carrying out the invention is to perform the processing steps of the invention on a large scale digital computer with the processed data printed into visible form on any of the presently available plotting devices.

While certain preferred embodiments of the invention have been specifically disclosed, it should be understood that the invention is not limited thereto as many variations will be readily apparent to those skilled in the art and the invention is to be given its broadest possible interpretation within the terms of the following claims:

What is claimed is:

1. A system for converting a seismic time section consisting of a plurality of amplitude-versus-time seismic traces, into a seismic depth section consisting of a plurality of amplitude-versus-depth traces, so that events on the time section are migrated, both vertically and horizontally, into positions on said depth section corresponding to the actual spatial positions of the seismic reflectors in the subsurface, comprising:
   (a) automated data processing means for sonogramming said amplitude-versus-time traces, a group of traces at a time, to produce a plurality of sonograms each identified, indexed and stored with a respective horizontal pivot coordinate of a respective group of sonogrammed amplitude-versus-time traces, and with a represented moveout,
   (b) machine means for dividing each individual sonogram into a series of segments in accordance with a preselected seismic velocity function, and re-indexing and storing, also in accordance with said preselected velocity function, each of said series of segments into a particular storage zonelet representing a portion of said seismic depth section identified and indexed by a particular depth and horizontal coordinate, each of said series of divided and stored segments also being identified and indexed within a particular zonelet in accordance with a represented dip angle,
   (c) machine means for automatically sonogramming said segments divided and stored within each of the zonelets to produce a final plurality of amplitude-versus-depth representations and
   (d) machine means for directing and plotting the placement of said final representations on said seismic depth section, so that said seismic reflectors in said subsurface can be identified, in the vertical and horizontal location, by amplitude variations on said amplitude-versus-depth traces of said depth section.

2. System for converting a seismic time section consisting of a plurality of amplitude-versus-time seismic traces, into a seismic depth section consisting of a plurality of amplitude-versus-depth traces, so that events on the time section are migrated, both vertically and horizontally, into positions on said depth section corresponding to the actual spatial positions of the seismic reflectors in the subsurface, comprising:
   (a) automated data processing means for sonogramming said amplitude-versus-time traces, a group of traces at a time, to produce a plurality of sonograms, each identified by a respective horizontal pivot coordinate of said original group and by a represented moveout,
   (b) automated data processing means for dividing said each individual sonogram into segments in accordance with a preselected seismic velocity function, and indexing and storing, also in accordance with said preselected seismic velocity function, said segments into zonelets each of which representing, depthwise, a portion of said seismic depth section and identified by particular depth and horizontal coordinates,
   (c) machine means for sonogramming in each of said zonelets said divided and stored segments to produce final amplitude-versus-depth segments, and plotting said final amplitude-versus-depth segments within final zonelets of said seismic depth section, said final zonelets of said depth section having boundaries, depthwise, corresponding to those of the respective zonelets of said machine divided and stored segments of (b).

3. The system of claim 2 wherein said machine divided, indexed and stored segments of (b) are ordered, as to position, within said zonelets according to their represented dip angles.

4. In a system for converting a seismic time section consisting of a plurality of amplitude-versus-time seismic traces, into a seismic depth section consisting of a plurality of amplitude-versus-depth traces where events on the time section are migrated, both vertically and horizontally, into positions on said depth section corresponding to the actual spatial positions of the seismic reflectors in the subsurface, and reflectors in the depth section are represented by amplitude variations on adjacent side-by-side traces, with each trace extending from a surface location in a direction representing vertical distance below said surface position, an improvement comprising:
 (a) for each zonelet representing a portion of said seismic depth section, automated machine means for generating a plurality of discrete, individual segments from individual sonograms of said seismic time sections, said automated means dividing said individual sonograms in accordance with a preselected seismic velocity function and then migrating, vertically and horizontally, them to said zonelets in accordance with said preselected seismic velocity function, said zonelets being identified by their depths and horizontal coordinates, each of said divided and migrated segments being ordered as to positions within each of said zonelets in accordance with its represented dip angle,
 (b) automated machine means for generating another series of sonograms of said divided and migrated segments to produce said final amplitude-versus-depth traces, and
 (c) machine means for plotting said final traces as said side-by-side traces of said seismic depth section whereby seismic reflectors in said subsurface can be identified, in the vertical and horizontal location, by amplitude variations on said amplitude-versus-depth traces of said depth section.

5. An apparatus for converting a seismic time section consisting of a plurality of amplitude-versus-time seismic traces, into a plurality of machine generated, amplitude-versus-depth representations, so that events on the time section are migrated, both vertically and horizontally, according to the depth and horizontal coordinates of the seismic reflectors within a subsurface earth formation, they represent, comprising:
 (a) automated data processing means for sonogramming said amplitude-versus-time traces, a group of traces at a time, to produce a plurality of sonograms each identified by and indexed through a respective horizontal pivot coordinate and a represented moveout,
 (b) automated means for machine dividing each of said individual sonograms into a series of segments in accordance with a seismic velocity function characteristic of the subsurface under study, and for each of a series of zonelets representing portions of said subsurface under study, said automated dividing means including separate means for placing, storing and indexing also in accordance with said seismic velocity function, said series of segments into said zonelets to provide said plurality of machine generated, amplitude-versus-depth representations.

6. A system for converting a seismic time section consisting of a plurality of amplitude-versus-time seismic traces, into a seismic depth section consisting of a plurality of amplitude-versus-depth traces, so that events on the time section are migrated, both vertically and horizontally, into positions on said depth section corresponding to the actual spatial positions of the seismic reflectors in the subsurface, comprising:
 (a) automated machine means for sonogramming said amplitude-versus-time traces, a group of traces at a time, to produce a series of sonograms each identified by and indexed as a function of a respective horizontal pivot coordinate and of a represented moveout,
 (b) automated machine means for rearranging individual, seismically continuous segments of each of said sonograms whereby said segments are ordered as to stored positions, their horizontal coordinates representing the horizontal coordinate and dip angle of subsurface reflector segments,
 (c) automated machine means for sonogramming said machine rearranged segments to produce final amplitude-versus-depth traces, and
 (d) machine means placing and re-indexing said final traces within said seismic depth section within boundaries corresponding to those of (b) from which said final traces were produced.

7. A system for converting a seismic time section consisting of a plurality of amplitude-versus-time seismic traces, into a sonogram section consisting of a plurality of amplitude-versus-depth traces, so that events on the time section are migrated, both vertically and horizontally, into positions on said sonograms section according to the depth and horizontal coordinates of the seismic reflectors they represent, comprising:
 (a) automated machine means for sonogramming said amplitude-versus-time traces, a group of traces at a time, to produce a series of sonogram traces, each sonogram trace being identified by and indexed through a respective horizontal pivot coordinate and a represented moveout,
 (b) automated machine means for mathematically dividing each of said individual sonogram traces into a plurality of segments in accordance with a seismic velocity function characteristic of the subsurface under study, and
 (c) automated machine means for directing the placing of and re-indexing of said segments in zonelets also in accordance with said seismic velocity function whereby seismic reflectors in the subsurface under study can be identified, in true vertical and horizontal locations.

8. A method for converting a seismic time section comprising a plurality of amplitude-versus-time seismic traces, into a seismic depth section comprising a plurality of amplitude-versus-depth traces, so that amplitudes representing events on the time section are migrated, both vertically and horizontally, into positions on said depth section corresponding to the actual spatial positions of the seismic reflectors in the subsurface, comprising the steps of:
 (a) by operation of automated data processing means, beam steering without substantially changing signal waveform, said amplitude-versus-time traces, a group of traces at a time, to produce a plurality of directional traces, each directional trace being identifiable by being its horizontal pivot point coordinate relative to said original group of amplitude-versus-time traces and by a beam steer angle selected from a given range of beam steer angles, (b) machine associating in accordance with a preselected seismic velocity function, each of a series of individual segments of each directional trace, with one of a plurality of zonelets representing a portion of said seismic depth section, each associated segment being identified by particular depth and horizontal coordinates of said one zonelet and its position in said zonelet, (c) by operation of automatic data processing means, again beam steering the collection of waveform-preserved trace segments associated with each of the zonelets over a plurality of beam steering angles corresponding to preselected dip angles of reflectors in said portion of said depth section, depth segments within final zonelets of said seismic depth section, said final zonelets of said depth section having boundaries corresponding to those of the respective zonelets of said machine divided and placed segments of step (b).

* * * * *